Patented Oct. 9, 1945

2,386,331

UNITED STATES PATENT OFFICE 2,386,331

3-DERIVATIVES OF THE SATURATED AND UNSATURATED ANDROSTANE-3-ONE-17-OLS SUBSTITUTED IN 17-POSITION AND PROCESS OF MAKING SAME AS WELL AS THE CORRESPONDING FREE KETONES

Karl Miescher, Riehen, Switzerland, assignor to Ciba Pharmaceutical Products Incorporated, Summit, N. J., a corporation No Drawing. Application November 10, 1943, Serial No. 509,776. In Switzerland December 10, 1938

8 Claims. (Cl. 260—239.5)

This application is a continuation in part of my copending application Serial No. 306,184, filed November 25, 1939.

It is known that saturated and unsaturated androstanolones containing a substituent, for example a saturated or unsaturated hydrocarbon radical, in the 17-position and a keto group in the 3-position, may be obtained by treating corresponding 3-oxy-compounds with oxidizing agents. Such a final oxidation, however, has shown itself in many cases to be undesirable. It has now been found that it may be avoided if metallo-organic compounds are allowed to react on 3-enolates or 3-acetals of saturated or unsaturated androstandiones, and, if required, the derivatives thus obtained are hydrolyzed.

As parent substances, for example the 3-enol ethers, like 3-methyl- or 3-ethyl-enol ethers as well as the 3-enol esters and the 3-acetals, for example the 3-glycolates or 3-propandiolates, of androstendiones or androstandiones or their derivatives may be used. These can be prepared according to the data of the publication of A. Serini and A. Klöster in "Berichte der deutschen chemischen Gesellschaft," vol. 71, page 1766 (1938).

Suitable metallo-organic compounds are, for example, the magnesium organo compounds, such as alkyl- (like methyl-, ethyl-), alkylene- (like allyl-), aralkyl- (like benzyl-) or aryl- (like phenyl-) magnesium halides, further zinc-alkyl compounds and the like.

As products of the present invention there may be named for example the 3-derivatives like 3-enolates (3-enol-ethers or -esters) or 3-acetals of the saturated and unsaturated androstane-3-one-17-ols containing in 17-position saturated hydrocarbon radicals like alkyl groups (methyl, ethyl groups) or hydrocarbon radicals containing double bonds like allyl- or benzyl-groups. Furthermore their hydrolysation products containing free 3-keto-groups are also obtained.

Example 1

A solution of 63 gms. of androstendione-3-mono-enol-ethylether in toluene is allowed to drop into an ethereal solution of 72 gms. of methyl-magnesium bromide. The mixed solutions are then boiled for some time. After the reaction is complete, the solution is decomposed with excess of ammonium chloride solution and the layers are separated. The 3-enol ether of the 17-methyl-testosterone is obtained after concentration of the organic solution and may easily be converted by an acid agent into the known 17-methyl-testosterone. In an analogous manner also the 17-ethyl-, -allyl-, or -benzyl-testosterones are obtained. The corresponding Grignard-reagents may be replaced for example by zinc derivatives.

Instead of the androstendione-3-mono-enol-ethylether one may start also from other androstendione-3-mono-enol-ethers, for example the methyl-, propyl-, benzyl- or trityl-ethers or even from corresponding 3-mono-enolesters or -acetals.

The 17-methyl-dihydro-testosterone, for example, may be obtained in a similar manner for example from the 3-glycol-acetal, other 3-mono-acetals, 3-mono-enolethers or -esters of androstandione.

The alcohols epimeric in 17-position may also be separated from the mother liquors of the reaction product.

Example 2

35 gms. of androstendione-3-mono-ethyleneglycol-acetal (M. Pt. 200°, obtainable by condensation of androstendione with ethyleneglycol in presence of acid as catalyst), 25 gms. of magnesium, some activated magnesium-copper-alloy and 500 cc. of ether are stirred in a flask. Into this, 70 cc. of allyl-bromide are dropped, when gentle reaction takes place. After the reaction has started, boiling is continued for 2 hours if necessary by externally warming the flask with warm water. The reaction mixture is then cooled with ice and treated with 200 cc. of water. Diluted sulfuric acid is added till acid to congo and the whole shaken at 35° C. to split the 17-allyl-testosterone-3-ethyleneglycol-acetal contained in the ether. The ether layer is then separated, dried and evaporated. From the residue there is obtained by chromatography the known 17-allyl-testosterone. In a similar manner other 3-acetals of saturated or unsaturated androstane-3-one-17-ols containing in 17-position a saturated or unsaturated hydrocarbon radical, e. g. 17-methyl-testosterone-3-acetals or 17-methyl-dihydrotestosterone-3-acetals, and their hydrolysation products are obtained.

What I claim is:

1. Process for the manufacture of a member of the group consisting of the saturated and unsaturated androstanolones substituted in 17-position and derivatives thereof, comprising allowing an allyl-magnesium halide to react on a member of the group consisting of the 3-acetals of saturated and unsaturated androstandiones, and then hydrolyzing the derivatives obtained.

2. The 3-acetals of the saturated and unsaturated androstane-3-one-17-ols containing in 17- position a member of the group consisting of saturated hydrocarbon radicals and hydrocarbon radicals containing double bonds.

3. The 3-acetals of the saturated and unsaturated androstane-3-one-17-ols containing in 17-position an alkyl group.

4. The 3-acetals of the saturated and unsaturated androstane-3-one-17-ols containing in 17-position a methyl group.

5. The 3-acetals of the saturated and unsaturated androstane-3-one-17-ols containing in 17-position an allyl group.

6. The 17-methyl-testosterone-3-acetals.

7. The 17-methyl-dihydrotestosterone-3-acetals.

8. 17-allyl-testosterone-3-ethyleneglycol - acetal.

KARL MIESCHER.